United States Patent
Koenig, II et al.

(10) Patent No.: US 10,281,628 B2
(45) Date of Patent: May 7, 2019

(54) METHOD OF PREPARING A PHOTOCHROMIC OPTICAL ARTICLE USING AN ORGANIC SOLVENT PRETREATMENT AND PHOTOCHROMIC COATING

(71) Applicant: Transitions Optical, Inc., Pinellas Park, FL (US)

(72) Inventors: Jerry L. Koenig, II, Largo, FL (US); Joseph David Turpen, Safety Harbor, FL (US); Glen Todd Owens, St. Petersburg, FL (US); Nancyanne Gruchacz, Clearwater, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 15/026,634

(22) PCT Filed: Oct. 3, 2014

(86) PCT No.: PCT/US2014/058933
§ 371 (c)(1),
(2) Date: Apr. 1, 2016

(87) PCT Pub. No.: WO2015/054037
PCT Pub. Date: Apr. 16, 2015

(65) Prior Publication Data
US 2016/0245967 A1    Aug. 25, 2016

Related U.S. Application Data

(60) Provisional application No. 61/890,045, filed on Oct. 11, 2013, provisional application No. 61/890,055, (Continued)

(51) Int. Cl.
*H05H 1/00* (2006.01)
*G02B 5/22* (2006.01)
(Continued)

(52) U.S. Cl.
CPC ............... *G02B 5/223* (2013.01); *B05C 5/02* (2013.01); *B05C 11/08* (2013.01); (Continued)

(58) Field of Classification Search
CPC ....... B05C 2/02; B05C 11/08; B05C 11/1036; G02B 5/223; G02B 1/14; B05D 3/002; B05D 3/101; B05D 3/104
See application file for complete search history.

(56) References Cited

U.S. PATENT DOCUMENTS 4,731,264 A    3/1988    Lin et al.
4,756,973 A    7/1988    Sakagami et al.
(Continued)

FOREIGN PATENT DOCUMENTS

EP    1433814 A1    6/2004
JP    6340725 A     2/1988
(Continued)

*Primary Examiner* — Michael P Wieczorek
(74) *Attorney, Agent, or Firm* — The Webb Law Firm (57) ABSTRACT

A method of preparing a photochromic optical article is provided, which includes: (i) applying a first organic solvent to a surface of an optical substrate, thereby forming an organic solvent wetted surface on the optical substrate; and (ii) applying a curable photochromic coating composition over the organic solvent wetted surface of said optical substrate, thereby forming a curable photochromic coating layer over the surface of the optical substrate. The curable photochromic coating composition includes a second organic solvent, and the first and second organic solvents are miscible with each other. With some embodiments, the first and second organic solvents are the same.

8 Claims, 1 Drawing Sheet

Related U.S. Application Data filed on Oct. 11, 2013, provisional application No. 61/890,059, filed on Oct. 11, 2013.

(51) Int. Cl.

| | | |
|---|---|---|
| *B29D 11/00* | (2006.01) | |
| *G03C 1/73* | (2006.01) | |
| *C08G 18/62* | (2006.01) | |
| *C08G 18/78* | (2006.01) | |
| *C08G 18/80* | (2006.01) | |
| *C08G 18/81* | (2006.01) | |
| *C08G 18/22* | (2006.01) | |
| *C08G 18/28* | (2006.01) | |
| *C09D 175/06* | (2006.01) | |
| *C08G 18/40* | (2006.01) | |
| *C08G 18/44* | (2006.01) | |
| *G02B 1/14* | (2015.01) | |
| *C08J 7/04* | (2006.01) | |
| *C08J 7/12* | (2006.01) | |
| *C09D 5/32* | (2006.01) | |
| *G02B 5/23* | (2006.01) | |
| *G02C 7/10* | (2006.01) | |
| *B05C 11/08* | (2006.01) | |
| *B05C 11/10* | (2006.01) | |
| *B05D 3/14* | (2006.01) | |
| *B05D 7/00* | (2006.01) | |
| *C09K 9/02* | (2006.01) | |
| *B05C 5/02* | (2006.01) | |
| *B05C 13/00* | (2006.01) | |
| *B05D 1/00* | (2006.01) | |
| *B05D 3/00* | (2006.01) | |
| *B05D 3/02* | (2006.01) | |

(52) U.S. Cl.
CPC ...... *B05C 11/1036* (2013.01); *B05C 11/1039* (2013.01); *B05C 13/00* (2013.01); *B05D 1/005* (2013.01); *B05D 3/007* (2013.01); *B05D 3/0272* (2013.01); *B05D 3/144* (2013.01); *B05D 7/546* (2013.01); *B29D 11/00884* (2013.01); *C08G 18/227* (2013.01); *C08G 18/289* (2013.01); *C08G 18/4063* (2013.01); *C08G 18/44* (2013.01); *C08G 18/6225* (2013.01); *C08G 18/7831* (2013.01); *C08G 18/7837* (2013.01); *C08G 18/807* (2013.01); *C08G 18/8175* (2013.01); *C08J 7/042* (2013.01); *C08J 7/123* (2013.01); *C09D 5/32* (2013.01); *C09D 175/06* (2013.01); *C09K 9/02* (2013.01); *G02B 1/14* (2015.01); *G02B 5/23* (2013.01); *G02C 7/102* (2013.01); *G03C 1/73* (2013.01); *C08J 2369/00* (2013.01); *C08J 2433/14* (2013.01); *C08J 2475/06* (2013.01); *C09K 2211/14* (2013.01)

(56) References Cited

U.S. PATENT DOCUMENTS

| | | | |
|---|---|---|---|
| 4,889,413 A | 12/1989 | Ormsby et al. | |
| 4,931,220 A | 6/1990 | Haynes et al. | |
| 5,134,191 A | 7/1992 | Takarada et al. | |
| 5,231,156 A | 7/1993 | Lin | |
| 5,462,806 A | 10/1995 | Konishi et al. | |
| 5,623,005 A | 4/1997 | Rickwood et al. | |
| 5,645,767 A | 7/1997 | Van Gemert | |
| 5,658,501 A | 8/1997 | Kumar et al. | |
| 5,698,141 A | 12/1997 | Kumar | |
| 5,723,072 A | 3/1998 | Kumar | |
| 5,962,617 A | 10/1999 | Slagel | |
| 6,022,497 A | 2/2000 | Kumar | |
| 6,150,430 A | 11/2000 | Walters et al. | |
| 6,153,126 A | 11/2000 | Kumar | |
| 6,175,450 B1 | 1/2001 | Andreani et al. | |
| 6,187,444 B1 | 2/2001 | Bowles, III et al. | |
| 6,784,120 B2 * | 8/2004 | Davlin | H01L 21/312 257/E21.259 |
| 6,787,289 B2 | 9/2004 | Yamada et al. | |
| 7,189,456 B2 | 3/2007 | King | |
| 7,261,843 B2 | 8/2007 | Knox et al. | |
| 7,410,691 B2 | 8/2008 | Blackburn et al. | |
| 7,452,611 B2 * | 11/2008 | Blackburn | G02B 5/23 351/159.01 |
| 7,465,414 B2 | 12/2008 | Knox et al. | |
| 7,628,862 B2 * | 12/2009 | Goto | H01L 21/6715 118/302 |
| 7,662,433 B2 * | 2/2010 | Ford | B29D 11/00865 427/163.1 |
| 7,811,480 B2 | 10/2010 | King | |
| 8,691,926 B2 | 4/2014 | Tanaka et al. | |
| 8,973,524 B2 * | 3/2015 | Endo | B05D 1/005 118/504 |
| 2002/0009599 A1 | 1/2002 | Welch et al. | |
| 2002/0168874 A1 | 11/2002 | Davlin et al. | |
| 2004/0220292 A1 | 11/2004 | Momoda et al. | |
| 2005/0004361 A1 | 1/2005 | Kumar et al. | |
| 2009/0133625 A1 | 5/2009 | Takahashi et al. | |
| 2012/0212840 A1 | 8/2012 | Bowles et al. | |
| 2012/0327364 A1 | 12/2012 | Valeri | |
| 2014/0340727 A1 | 11/2014 | Mori et al. | |

FOREIGN PATENT DOCUMENTS

| | | |
|---|---|---|
| JP | 3253087 B2 | 2/2002 |
| JP | 2002177852 A | 6/2002 |
| JP | 2003523475 A | 8/2003 |
| JP | 2007175697 A | 7/2007 |
| KR | 20040023682 A | 3/2004 |
| RU | 2150388 C1 | 6/2000 |
| RU | 2271365 C2 | 3/2006 |
| RU | 2360932 C2 | 7/2009 |
| RU | 2402578 C1 | 10/2010 |
| TW | 201331249 A | 8/2013 |
| WO | 9420581 A1 | 9/1994 |
| WO | 03058300 A1 | 7/2003 |

* cited by examiner

METHOD OF PREPARING A PHOTOCHROMIC OPTICAL ARTICLE USING AN ORGANIC SOLVENT PRETREATMENT AND PHOTOCHROMIC COATING

CROSS REFERENCE TO RELATED APPLICATIONS

The present application is entitled to and claims priority to U.S. Provisional Patent Application No. 61/890,045, filed Oct. 11, 2013, U.S. Provisional Patent Application No. 61/890,055, filed Oct. 11, 2013, and U.S. Provisional Patent Application No. 61/890,059, filed Oct. 11, 2013, the disclosures of which are each incorporated herein by reference in each case in their entirety.

FIELD

The present invention relates to a method of preparing a photochromic optical article using an organic solvent pretreatment and photochromic coating.

BACKGROUND

Optical articles that provide good imaging qualities while reducing the transmission of incident light into the eye are needed for a variety of applications, such as sunglasses, vision correcting ophthalmic lenses, plano lenses and fashion lenses, e.g., non-prescription and prescription lenses, sport masks, face shields, goggles, visors camera lenses, windows, automotive windshields and aircraft and automotive transparencies, e.g., T-roofs, sidelights and backlights.

In response to certain wavelengths of electromagnetic radiation (or actinic radiation), photochromic materials undergo a transformation from one form or state to another form, with each form having a characteristic or distinguishable absorption spectrum associated therewith. Typically, upon exposure to actinic radiation, many photochromic materials are transformed from a closed-form, which corresponds to an unactivated (or bleached, e.g., substantially colorless) state of the photochromic material, to an open-form, which corresponds to an activated (or colored) state of the photochromic material. In the absence of exposure to actinic radiation, such photochromic materials are reversibly transformed from the activated (or colored) state, back to the unactivated (or bleached) state.

Photochromic plastic articles used for optical applications have been the subject of considerable attention. In particular, photochromic ophthalmic plastic lenses have been of interest because of the advantages associated with reduced weight that they can provide compared to glass lenses. Photochromic optical articles typically display colorless (e.g., clear) and colored states that correspond to the colorless and colored states of the photochromic materials contained therein. Photochromic compounds can be incorporated into optical articles, by methods including, imbibing a photochromic compound directly into an optical substrate, or by forming a photochromic coating layer over an optical substrate, which contains a photochromic compound.

When a photochromic coating composition is applied over a surface of an optical substrate, insufficient wetting of the surface by the photochromic coating composition can occur. Insufficient wetting of the surface by the photochromic coating composition can require the application of additional photochromic coating composition over the surface to ensure the formation of a uniform photochromic coating layer thereover. In some application methods, such as spin coating methods, some of the excess or additionally applied photochromic coating composition is ejected off of the edges of the rotating optical substrate. While the ejected photochromic coating composition can be collected and recycled, due to contamination concerns, the ejected photochromic coating composition is often disposed of as waste or a waste stream.

Photochromic compounds can be expensive. As such, it would be desirable to develop new methods of forming photochromic coating layers on optical substrates that require the application of a minimum or reduced amount of photochromic coating composition thereover. In addition, it would be desirable that such newly developed methods minimize or reduce the amount of photochromic coating composition waste that is formed during such coating processes.

SUMMARY

In accordance with the present invention there is provided a method of preparing a photochromic optical article that comprises: (i) applying a first organic solvent to a surface of an optical substrate, thereby forming an organic solvent wetted surface on the optical substrate; and (ii) applying a curable photochromic coating composition over the organic solvent wetted surface of the optical substrate, thereby forming a curable photochromic coating layer over the surface of said optical substrate, wherein the curable photochromic coating composition comprises a second organic solvent. The first organic solvent of step (i) and the second organic solvent of said curable photochromic coating composition are miscible with each other.

In accordance with the present invention there is further provided a method of preparing a photochromic article comprising: (a) mounting an optical substrate on a rotatable chuck of a spin coating bowl of a spin coater; (b) applying a first organic solvent to a surface of the optical substrate with rotation of the optical substrate by the rotatable chuck, thereby forming an organic solvent wetted surface on the optical substrate; and (c) applying a curable photochromic coating composition over the organic solvent wetted surface of the optical substrate with rotation of the optical substrate by the rotatable chuck, thereby forming a curable photochromic layer over the surface of said optical substrate, wherein the curable photochromic coating composition comprises a second organic solvent, and wherein the first organic solvent and the second organic solvent are miscible with each other. The curable photochromic layer can, with some embodiments, be at least partially cured, thereby forming an at least partially cured photochromic coating layer on the optical substrate.

In further accordance with the present invention, the method of preparing a photochromic article further comprises, in addition to steps (a), (b), and (c) above: (d) curing, at least partially, the photochromic coating layer in a first curing station, thereby forming an at least partially cured photochromic coating layer on the optical substrate; (e) mounting the optical substrate, comprising the at least partially cured photochromic coating layer, on the rotatable chuck of the spin coating bowl of the spin coater; (f) applying a curable protective coating composition over the at least partially cured photochromic coating layer of the optical substrate with rotation of the rotatable chuck, thereby forming a protective coating layer over the at least partially cured photochromic coating layer; and (g) at least partially curing the protective coating layer over the optical substrate in a second curing station, thereby forming an at least partially cured protective coating layer over the optical substrate.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 through 4 like characters refer to the same components, elements, and process steps, as the case may be, unless otherwise stated.

DETAILED DESCRIPTION

The terms "optical," "optically clear," and similar terms as used herein mean that the specified material (such as a substrate, film, coating, etc.) exhibits a light transmission value (transmits incident light) of at least 4 percent, and exhibits a haze value of less than 1 percent (such as, a haze value of less than 0.5 percent) when measured at 550 nanometers by, for example, a Haze Gard Plus Instrument.

As used herein, the term "photochromic" means having an absorption spectrum for at least visible radiation that varies in response to absorption of at least actinic radiation. Further, as used herein the term "photochromic material" means any substance that is adapted to display photochromic properties, i.e. adapted to have an absorption spectrum for at least visible radiation that varies in response to absorption of at least actinic radiation.

As used herein the term "ophthalmic" means pertaining to or associated with the eye and vision. As used herein the term "ophthalmic substrate" means a substrate, such as a lens, that is ophthalmic. As used herein the terms "lens" and "lenses" means and encompasses at least, individual lenses, lens pairs, partially formed (or semi-finished) lenses, fully formed (or finished) lenses, and lens blanks. Examples of ophthalmic substrates, articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, protective lenses, protective visors, and protective shields.

As used herein, the term "transparent," such as used in connection with a substrate, film, material, and/or coating, means that the indicated substrate, (such as coating, film and/or material) has the property of transmitting light without appreciable scattering so that objects lying beyond are visibly observable.

As used herein, the term "coating" means a supported film derived from a flowable coating composition, which can optionally have a uniform thickness, and specifically excludes polymeric sheets. By contrast, as used herein the term "sheet" means a pre-formed film having a generally uniform thickness and which is capable of self-support. A sheet has two opposing surfaces, in which at least one surface thereof can have thereover one or more layers (including coating layers). As used herein, the terms "layer" and "film" each encompass both coatings (such as a coating layer or a coating film) and sheets, and a layer can include a combination of separate layers, including sub-layers and/or over-layers. In accordance with some embodiments, and as used herein, the term "coating" means, within appropriate context, the process of applying a coating composition (or material) to the substrate to form a coating (or coating layer).

As used herein, the term "substrate" means an article having at least one surface that is capable of accommodating a photochromic coating, e.g., a photochromic polymeric coating; namely, the substrate has a surface to which a photochromic coating can be applied. Non-limiting embodiments of the shape the surface of the substrate can have include, round, flat, cylindrical, spherical, planar, substantially planar, plano-concave and/or plano-convex, curved, including but not limited to, convex and/or concave, as exemplified by the various base curves used for ophthalmic lenses.

As used herein, the terms "cure," "cured," and related terms, means that at least a portion of the polymerizable and/or crosslinkable components that form a curable composition are at least partially polymerized and/or cross-linked. In accordance with some embodiments, the degree of crosslinking can range from 5% to 100% of complete crosslinking. In accordance with some further embodiments, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "actinic radiation" means electromagnetic radiation that is capable of causing a response in a material, such as, but not limited to, transforming a photochromic material from one form or state to another as discussed in further detail herein, or curing a material, such as a coating composition. Actinic radiation includes electromagnetic radiation having wavelengths ranging from the ultraviolet ("UV") light range, through the visible light range, and into the infrared (IR) range. Actinic radiation which can be used to cure coating compositions used in the present invention generally has wavelengths of electromagnetic radiation ranging from 150 to 2,000 nanometers (nm), can range from 180 to 1,000 nm, and also can range from 200 to 500 nm. Examples of suitable ultraviolet light sources include mercury arcs, carbon arcs, low, medium or high pressure mercury lamps, swirl-flow plasma arcs and ultraviolet light emitting diodes. With some embodiments ultraviolet light-emitting lamps include medium pressure mercury vapor lamps having outputs ranging from 200 to 600 watts per inch (79 to 237 watts per centimeter) across the length of the lamp tube. With some embodiments, a 1 mil (25 micrometers) thick wet film of a coating composition can be cured through its thickness to a tack-free state upon exposure to actinic radiation by passing the film under medium pressure mercury vapor lamps so as to provide an actinic radiation exposure at 200 to 1000 millijoules per square centimeter of the wet film.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, physical properties, and so forth used in the specification and claims, are to be understood as modified in all instances by the term "about."

As used herein, the term "valve-less" means being free of a valve (not including a valve).

As used herein, the spin coater that can be used in conjunction with some embodiments of the method of the present invention is also referred to as a flexible spin coater for purposes including, but not limited to, indicating the flexibility the spin coater can provide with regard to applying a plurality of coating compositions in a sequence that can be selected from a plurality of coating application sequences.

As used herein, the term "IR" means infrared, such as infrared radiation.

As used herein, the term "UV" means ultraviolet, such as ultraviolet radiation.

As used herein, the term "miscible," such as with regard to the first and second organic solvents, means capable of mixing in any ratio without separation into multiple phases, such as into two phases.

The various embodiments and examples of the present invention as presented herein are understood to be illustrative of the present invention and not restrictive thereof and are non-limiting with respect to the scope of the invention.

The method of the present invention involves applying a first organic solvent to a surface of an optical substrate. Examples of optical substrates that can be coated with the method of the present invention include, but are not limited to, plano lenses, prescription lenses, which in each case can be finished lenses, unfinished lenses, or lens blanks. In accordance with some further embodiments, the lenses coated with the method of the present invention, have a diameter of 50-85 mm with varied back curvatures (such as, from ½ base up to 10 base). For reference a finished lens is one that will have the front and rear surface of the lens formed (commonly by grinding and polishing) to the desired contour, while a semi-finished lens will have only one (e.g., the top or front) surface finished. Both finished and unfinished lens often undergo further processing such as coating with photochromic material, hard coats, tinting layers, planarizing layers (generally categorized as coating layers providing optical, aesthetic or protective properties) as well as edging to fit the desired shape or other processing to couple to a frame or support structure.

The optical substrate that is pre-treated and coated with the method of the present invention can, with some embodiments, be formed from and correspondingly include organic materials, inorganic materials, or combinations thereof (for example, composite materials).

Examples of organic materials that can be used as optical substrates in accordance with various embodiments of the present invention, include polymeric materials, such as homopolymers and copolymers, prepared from the monomers and mixtures of monomers disclosed in U.S. Pat. No. 5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

With some embodiments of the present invention, the optical substrate can be an ophthalmic substrate. Examples of organic materials suitable for use in forming ophthalmic substrates include art-recognized polymers that are useful as ophthalmic substrates, such as organic optical resins that are used to prepare optically clear castings for optical applications, such as ophthalmic lenses.

Examples of inorganic materials that can be used as optical substrates with some embodiments of the present invention include glasses, minerals, ceramics, and metals. With some embodiments, the optical substrate can include glass. In other embodiments, the optical substrate can have a reflective surface, for example, a polished ceramic substrate, metal substrate, or mineral substrate. In other embodiments, a reflective coating or layer (e.g., a metal layer, such as a silver layer) can be deposited or otherwise applied to a surface of an inorganic or an organic substrate to make it reflective or to enhance its reflectivity.

Optical substrates that can be used with the method according to some embodiments of the present invention can also include untinted, tinted, linearly polarizing, circularly polarizing, elliptically polarizing, photochromic, or tinted-photochromic substrates. As used herein with reference to optical substrates, the term "untinted" means optical substrates that are essentially free of coloring agent additions (such as conventional dyes) and have an absorption spectrum for visible radiation that does not vary significantly in response to actinic radiation. Further, with reference to optical substrates the term "tinted" means substrates that have a coloring agent addition (such as conventional dyes) and an absorption spectrum for visible radiation that does not vary significantly in response to actinic radiation.

As used herein, the term "circularly polarizing" with reference to optical substrates refers to optical substrates that are adapted to circularly polarize electromagnetic radiation. As used herein, the term "elliptically polarizing" with reference to optical substrates refers to optical substrates that are adapted to elliptically polarize electromagnetic radiation. Further, as used herein, with reference to optical substrates, the term "tinted-photochromic" means optical substrates containing a coloring agent addition as well as a photochromic material, and having an absorption spectrum for visible radiation that varies in response to at least actinic radiation. Thus, for example, a tinted-photochromic substrate can have a first color characteristic of the coloring agent and a second color characteristic of the combination of the coloring agent and the photochromic material when exposed to actinic radiation.

The method of the present invention includes, with some embodiments, the step of applying a first organic solvent to a surface of an optical substrate, which results in the formation of an organic solvent wetted surface on the optical substrate. As used herein, the term "an organic solvent wetted surface" means that the first organic solvent is present on the surface of the optical substrate, such as, with some further embodiments, substantially uniformly present across the surface of the optical substrate to which the first organic solvent has been applied.

The first organic solvent can be applied using one or more art-recognized application methods. In accordance with some embodiments, the first organic solvent is applied to a surface of the optical substrate, by spray methods, curtain coating methods, dip (or immersion) coating methods, spin coating methods, doctor (or draw-down) blade application methods, and combinations of two or more such application methods.

The first organic solvent, with some embodiments, is applied to a surface of the optical article under ambient conditions, such as, conditions of standard temperature and pressure.

The first organic solvent can, with some embodiments, be a single organic solvent or a combination of two or more organic solvents. The first organic solvent, with some embodiments, is selected from N-methyl 2-pyrrolidone, diethylene glycol monobutyl ether, 2-butoxyethyl ester of acetic acid, ethylene glycol monohexyl ether, n-butyl acetate, glycol ethers, hydrocarbon blends including aromatic hydrocarbon blends; and combinations of two or more such organic solvents. The hydrocarbons of the hydrocarbon blends can, with some embodiments, include: (i) one or more $C_5$-$C_{30}$ linear or branched hydrocarbons, which can be free of carbon-carbon unsaturation and/or include carbon-carbon unsaturation selected from divalent alkene groups, such as —CH═CH—, and/or divalent alkyne groups, such as —C≡C—; and/or (ii) one or more $C_5$-$C_{18}$ aromatic mono- and/or poly-cyclic fused-ring aromatic hydrocarbons.

In accordance with some further embodiments of the method of the present invention, the first organic solvent is N-methyl 2-pyrrolidone.

The method of the present invention further involves, with some embodiments, applying a curable photochromic coating composition over the organic solvent wetted surface of the optical substrate. Such application of the curable photochromic coating composition results in the formation of a curable photochromic coating layer over the surface of the optical substrate. The curable photochromic coating composition includes a second organic solvent.

The curable photochromic coating composition of the method of the present invention includes an organic solvent, of which the second organic solvent can form a part or the whole of the organic solvent of the curable photochromic coating composition. With some embodiments, the second organic solvent is present in the organic solvent of the curable photochromic coating composition in an amount of from 51 percent by weight to 100 percent by weight, or from 60 percent by weight to 100 percent by weight, or from 75 percent by weight to 100 percent by weight, or from 80 percent by weight to 100 percent by weight, or from 90 percent by weight to 100 percent by weight, or from 95 percent by weight to 100 percent by weight, where the percent weights in each case are based on the total weight of the organic solvent of the curable photochromic coating composition.

The organic solvent can be present in the curable photochromic coating composition, with some embodiments, in an amount of from 1 percent by weight to 95 percent by weight, or from 10 percent by weight to 75 percent by weight, or from 25 percent by weight to 60 percent by weight, where the percent weights are in each case based on total weight of the curable photochromic coating composition.

The second organic solvent of the curable photochromic coating composition, with some embodiments, can be a single organic solvent or a combination of two or more organic solvents. With some further embodiments, the second organic solvent is selected from N-methyl 2-pyrrolidone, diethylene glycol monobutyl ether, 2-butoxyethyl ester of acetic acid, ethylene glycol monohexyl ether, n-butyl acetate, glycol ethers, hydrocarbon blends including aromatic hydrocarbon blends; and combinations of two or more such organic solvents. The hydrocarbons of the hydrocarbon blends can, with some embodiments, include: (i) one or more $C_5$-$C_{30}$ linear or branched hydrocarbons, which can be free of carbon-carbon unsaturation and/or include carbon-carbon unsaturation selected from divalent alkene groups, such as —CH═CH—, and/or divalent alkyne groups, such as —C≡C—; and/or (ii) one or more $C_5$-$C_{18}$ aromatic mono- and/or poly-cyclic fused-ring aromatic hydrocarbons.

In accordance with some further embodiments of the method of the present invention, the second organic solvent, of the curable photochromic coating composition, is N-methyl 2-pyrrolidone.

In accordance with some embodiments of the present invention, the first organic solvent and the second organic solvent (of the curable photochromic coating composition) are miscible with each other. The first organic solvent can include one or more organic solvents, and the second organic solvent can include one or more organic solvents, provided that the first organic solvent and the second organic solvent are miscible with each other, and as such the first organic solvent and the second organic solvent, when mixed, in any ratio, will form a single phase and be free of separation into two or more phases.

The first organic solvent and the second organic solvent, with some embodiments, are the same. With some embodiments, the first organic solvent is composed of a single organic solvent, the second organic solvent is composed of a single organic solvent, which in each case is the same organic solvent. With some further embodiments, the first organic solvent is composed of two or more organic solvents, the second organic solvent is composed of two or more organic solvents, and the first and second organic solvents are each composed of the same combination of organic solvents in the same proportions, such as percent weights based on total weight of the combination of organic solvents.

The curable photochromic coating composition of the method of the present invention includes, with some embodiments: a curable resin component; a photochromic compound; an organic solvent (which includes the second organic solvent, as described previously herein); and optionally one or more additives. In accordance with some embodiments of the present invention, the applied curable photochromic coating composition can be cured by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

In accordance with some embodiments, the resulting (or cured) photochromic coating layer (resulting from cure of the applied curable photochromic coating composition) includes an organic matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the organic matrix of the photochromic coating layer by free radical reactions or free radical polymerization, such as in the case of actinic radiation curable coating compositions.

In accordance with some embodiments, the method of the present invention further includes curing the curable photochromic coating layer, which results in formation of a cured photochromic coating layer. In accordance with some further embodiments, the cured photochromic coating layer includes urethane linkages, such as —N(H)—C(O)—O— linkages, and/or thiourethane linkages, such as —N(H)—C(O)—S— linkages. Urethane linkages result from, with some embodiments, the reaction of a hydroxyl group (—OH) with an isocyanate group (—NCO). Thiourethane linkages result from, with some embodiments, the reaction of a thiol group (—SH) with an isocyanate group (—NCO). The hydroxyl and thiol groups can be present on one or more polymers, including those described previously herein, such as a (meth)acrylate polymer, with some embodiments. The isocyanate groups can be present on a polyisocyanate crosslinker, including those as described further herein, with some embodiments.

In accordance with some further embodiments, the curable photochromic coating composition includes: a (meth) acrylate copolymer having active hydrogen functionality selected from hydroxyl, thiol, primary amine, secondary amine, and combinations thereof; optionally a polyol that is different than the (meth)acrylate copolymer; a polyisocyanate, such as a diisocyanate and/or a triisocyanate, each optionally blocked with a suitable blocking or leaving group, such as, 3,5-dimethyl pyrazole; one or more organic solvents, as described previously herein; and optionally one or more additives, including, but not limited to, adhesion promoters, coupling agents, ultraviolet light absorbers, thermal stabilizers, catalysts, free radical scavengers, plasticizers, flow additives, and/or static tints or static dyes (i.e., tints or dyes that are not photochromic).

Examples of (meth)acrylate monomers from which the active hydrogen functional (meth)acrylate copolymer of the curable photochromic coating composition can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Examples of polyols that can be present in the curable photochromic coating composition include, but are not limited to glycerin, trimethylolpropane, trimethylolethane, trishydroxyethylisocyanurate, pentaerythritol, ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyOdiphenol, and 4,4'-methylenediphenol. With some further embodiments, the polyols that can be present in the curable photochromic coating composition include, but are not limited to, polyols having number average molecular weights of from 500 to 3500, or from 650 to 2500, or from 650 to 1500, or from 850 to 1200, or from 850 to 1000, such as, but not limited to, polyether polyols and/or polycarbonate polyols. Additional polyols that can be used in the curable photochromic coating composition from which the photochromic coating layer is prepared include, but are not limited to, art-recognized materials, such as polyether polyols and polycarbonate polyols, described in U.S. Pat. No. 7,465,414 at column 15, line 22 through column 16, line 62, which disclosure is incorporated herein by reference.

In accordance with some further embodiments, the polyols that can be present in the curable photochromic coating include, but are not limited to, one or more high molecular weight polycarbonate polyols, that have carbonate groups within the backbone thereof. With some embodiments, such high molecular weight polycarbonate polyols are high molecular weight polycarbonate diols. With some additional embodiments, the high molecular weight polycarbonate polyols further include one or more linkages in the backbone that are selected from ester linkages, ether linkages, amide linkages, and/or urethane linkages. The high molecular weight polycarbonate polyols, with some embodiments, have Mn values of at least 5000 g/mole, or at least 6000 g/mole, or at least 8000 g/mole. The high molecular weight polycarbonate polyols, with some embodiments, have Mn values of less than or equal to 20,000 g/mole, or less than or equal to 15,000 g/mole, or less than or equal to 10,000 g/mole. In accordance with some further embodiments, the high molecular weight polycarbonate polyols have Mn values ranging between any combination of the above recited upper and lower v, such as from 5000 to 20,000 g/mole, or from 6000 to 15,000 g/mole, or from 8000 to 10,000 g/mole. The polycarbonate polyols, with some embodiments, have PDI values of less than or equal to 2.0, or less than or equal to 1.5, or less than or equal to 1.3.

The high molecular weight polycarbonate polyols are, with some embodiments, prepared by art-recognized isolation methods that involve isolating a high molecular weight fraction of polycarbonate polyols from a feed polycarbonate polyol that is composed of a mixture of low and high molecular weight polycarbonate polyols. With some embodiments, the high molecular weight polycarbonate polyols are obtained by successively washing a feed polycarbonate polyol with a suitable solvent, such as methanol, with removal of a low molecular weight fraction between each successive washing, until a product polycarbonate polyol is obtained that has a desirably high (or increased) molecular weight, such as an Mn value of at least 5000 g/mole, and a desirably low (or reduced) PDI value, such as less than or equal to 1.5. With some embodiments, the high molecular weight polycarbonate polyols are isolated from feed aliphatic polycarbonate polyols. Examples of commercially available feed aliphatic polycarbonate polyols, from which the high molecular weight polycarbonate polyols are isolated, with some embodiments, include but are not limited to: PC-1122 polycarbonate polyol, which is commercially available from Stahl USA; ETERACOLL™ PH-200D, PH-200 and UH-200 polycarbonate polyols, which are commercially available from Ube Chemical; DURANOL™ T5652 polycarbonate polyol, which is commercially available from Asahi-KASEI; and/or RAVE-CARB™ 107 polycarbonate polyol, which is commercially available from Enichem.

High molecular weight polycarbonate polyols that can be present in the curable photochromic coating include, but are not limited to, those described in further detail in paragraphs [0041]-[0047] and [0102]-[0114] of United States Patent Application Publication No. US 2012/0212840 A1, the cited disclosure of which is incorporated herein by reference.

Polyfunctional isocyanates (or polyisocyanates) that can be present in the curable photochromic coating composition from which the photochromic coating layer is prepared (or formed) include, but are not limited to, aliphatic, aromatic, cycloaliphatic and heterocyclic polyisocyanates, and mixtures of such polyisocyanates. Examples of polyisocyanates that can be present in the photochromic coating composition include, but are not limited to: toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; dimers and trimers of such diisocyanates containing isocyanurate, uretidino, biruet, or allophanate linkages (such as a trimer of isophorone diisocyanate); and mixtures and/or combinations of two or more thereof. Further examples of polyisocyanates that can be present in the photochromic coating composition include, but are not limited to those described in U.S. Pat. No. 7,465,414 at column 16, line 63 through column 17, line 38, which disclosure is incorporated herein by reference.

Catalysts that catalyze the formation of urethane linkages that can be used in the curable photochromic coating composition from which the photochromic coating layer is prepared (or formed) include, but are not limited to, art-recognized materials, such as one or more stannous salts of an organic acid, examples of which include, but are not limited to, stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Additional classes of catalysts include, but are not limited to, bismuth salts of organic acids, such as bismuth 2-ethyihexanoate, and zinc-based catalysts. The catalyst is present in the curable photochromic coating composition, with some embodiments, in an amount that is at least sufficient to catalyze the formation of urethane linkages under the particular cure conditions that are employed. With some embodiments, the catalyst is a stannous salt of an organic acid, which is present in an amount of from 0.0005-0.02 parts per 100 parts of the polyurethane-forming components. Further non-limiting examples of components, such as polyols, polyisocyanates, and catalysts, that can, with some embodiments, be used with curable polyurethane coating compositions from which the curable photochromic coating compositions of the method of the present invention can be selected, are described in U.S. Pat. Nos. 4,889,413 and 6,187,444 B1.

The curable photochromic coating composition can further include at least one additive that, with some embodiments, is capable of facilitating one or more of the processing, the properties, or the performance of the curable photochromic coating composition and resulting photochromic coating layer. Non-limiting examples of such additives include static dyes, photoinitiators, thermal initiators, polymerization inhibitors, light stabilizers (such as, but not limited to, ultraviolet light absorbers and light stabilizers, such as hindered amine light stabilizers (HALS)), heat stabilizers (such as, but not limited to, hindered phenols), mold release agents, rheology control agents, leveling agents (such as, but not limited to, surfactants), free radical scavengers, and adhesion promoters (such as hexanediol diacrylate and coupling agents).

Examples of static dyes (i.e., tints or dyes that are not photochromic) that can be present in the curable photochromic coating composition and the resulting photochromic coating layer include, but are not limited to, art-recognized static organic dyes that are capable of imparting a desired color or other optical property to the photochromic coating layer. Examples of static dyes that can be present in the photochromic coating composition and photochromic coating layer include, but are not limited to, azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and mixtures and/or combinations thereof. Examples of anthraquinone dyes from which the fixed dye can be selected, with some embodiments, include but are not limited to, 1,4-dihydroxy-9,10-antracenedione (CAS registry No. 81-64-1), 1,4-bis(4-methylphenyl)amino-9,10-anthracendione (CAS registry No. 128-80-3), 1,4-bis((2-bromo-4,6-dimethylphenyl)amino)-9,10-anthracenedione (CAS registry No. 18038-98-8), and mixtures thereof.

The curable photochromic coating composition, and correspondingly the photochromic coating layer, includes at least one photochromic compound. Classes of photochromic compounds that can be included in the photochromic coating composition include, but are not limited to, inorganic photochromic compounds, thermally reversible pyrans, non-thermally reversible pyrans, thermally reversible oxazines, non-thermally reversible oxazines, thermally reversible fulgides, and/or non-thermally reversible fulgides.

Examples of inorganic photochromic compounds that can be included in the photochromic coating composition include, but are not limited to, crystallites of silver halide, cadmium halide, and/or copper halide. Further examples of inorganic photochromic materials include, but are not limited to, those prepared by the addition of europium(II) and/or cerium(II) to a mineral glass, such as a soda-silica glass. In accordance with some embodiments, the inorganic photochromic materials can be added to molten glass and formed into particles that are incorporated into the photochromic coating composition to form microparticles comprising such particulates. The glass particulates can be formed by any of a number of various art-recognized methods. Further examples of inorganic photochromic materials are further described in Kirk Othmer Encyclopedia of Chemical Technology, 4th ed., volume 6, pages 322-325.

Examples of thermally reversible photochromic pyrans from which photochromic compound(s) can be chosen and that can be used with various embodiments of the present invention, include, but are not limited to: benzopyrans; naphthopyrans, e.g., naphtho[1,2-b]pyrans, naphtho[2,1-b]pyrans; indeno-fused naphthopyrans, such as those disclosed in U.S. Pat. No. 5,645,767 at col. 2, line 16 to col. 12, line 57; heterocyclic-fused naphthopyrans, such as those disclosed in U.S. Pat. No. 5,723,072 at col. 2, line 27 to col. 15, line 55, U.S. Pat. No. 5,698,141 at col. 2, line 11 to col. 19, line 45, U.S. Pat. No. 6,153,126 at col. 2, line 26 to col. 8, line 60, and U.S. Pat. No. 6,022,497 at col. 2, line 21 to col. 11, line 46; spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. Additional examples of naphthopyrans and related organic photochromic substances are described, for example, in U.S. Pat. No. 5,658,501 at col. 1, line 64 to col. 13, line 17. The pertinent cited portions of the preceding U.S. patents are incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of thermally reversible photochromic oxazines from which photochromic compound(s) can be chosen and that can be used with various embodiments of the present invention, include, but are not limited to, benzoxazines, naphthoxazines, and spiro-oxazines, e.g., spiro(indoline) naphthoxazines, spiro(indoline)pyridobenzoxazines, spiro (benzindoline) pyridobenzoxazines, spiro(benzindoline) naphthoxazines, spiro(indoline)benzoxazines, spiro (indoline)fluoranthenoxazine, and spiro(indoline) quinoxazine.

Examples of thermally reversible photochromic fulgides from which photochromic compound(s) can be chosen and that can be used with various embodiments of the present invention, include, but are not limited to: fulgimides, such as, 3-furyl and 3-thienyl fulgimides; fulgides, such as 3-furyl and 3-thienyl fulgides, which are disclosed in U.S. Pat. No. 4,931,220 at column 2, line 51 to column 10, line 7, and mixtures of any of the aforementioned photochromic materials/compounds. Examples of further non-thermally reversible photochromic compounds that can be used with various embodiments of the present invention, include, but are not limited to the photochromic compounds disclosed in US Patent Application Publication 2005/0004361 at paragraphs [0314] to [0317].

With some embodiments, the curable photochromic coating composition includes a photochromic compound selected from indeno-fused naphthopyrans, naphtho[1,2-b] pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline) naphthoxazines, spiro(indoline)pyridobenzoxazines, spiro (indoline)fluoranthenoxazines, spiro(indoline)quinoxazines, fulgides, fulgimides, diarylethenes, diarylalkylethenes, diarylalkenylethenes, and combinations of two or more thereof.

The photochromic compound is present in the photochromic coating layer in an amount at least sufficient so as to provide the photochromic optical article with a desirable level of photochromic properties, which in some embodiments is referred to as a photochromic amount. With some embodiments, the amount of photochromic compound(s) present in the photochromic coating layer is from 0.01 percent by weight to 40 percent by weight, based on the total weight of photochromic coating layer.

The curable photochromic coating composition can be applied over the organic solvent wetted surface of the optical substrate by art-recognized methods. With some embodiments, the curable photochromic coating composition is applied by spray methods, curtain coating methods, dip (or immersion) coating methods, spin coating methods, doctor (or draw-down) blade application methods, and combinations thereof.

The photochromic coating layer, resulting from application and curing of the curable photochromic coating composition, can be include a single layer or multiple layers, in which each layer includes one or more photochromic compounds. The photochromic coating layer can have any suitable thickness, provided it provides a desirable level of photochromic properties, such as but not limited to a desirable range of optical density values. With some embodiments, the photochromic coating layer has a thickness of from 0.5 to 50 microns, such as from 1 to 45 microns, or from 2 to 40 microns, or from 5 to 30 microns, or from 10 to 25 microns.

Figure 4:
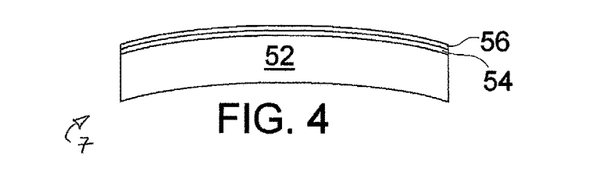
FIG. 4 is a representative schematic section view of a photochromic optical article prepared in accordance with the method of the present invention.

For purposes of non-limiting illustration and with reference to FIG. 4, the method of the present invention, with some embodiments, results in the formation of a photochromic optical article 7, having an optical substrate 52, with a photochromic coating layer 52 formed on a surface thereof (such as an upper or forward surface, as depicted). In accordance with some further embodiments, the method of the present invention, involves the formation of a protective coating layer over the previously applied photochromic coating layer, as described in further detail herein. With further reference to FIG. 4, photochromic optical article 7 further includes a protective coating layer 56 over underlying photochromic coating layer 54.

Figure 3A:
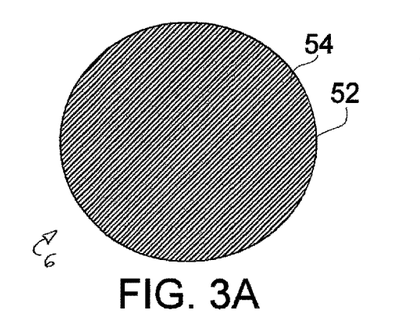
FIG. 3A is a representative schematic top plan view of a photochromic optical article prepared in accordance with some embodiments of the method of the present invention.
Figure 3B:
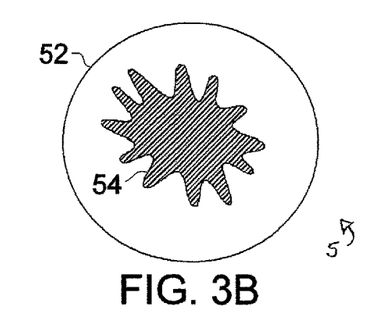
FIG. 3B is a representative schematic top plan view of a photochromic optical article prepared using the same photochromic coating and amount thereof used to form the photochromic optical article of FIG. 3A, without using the organic solvent pretreatment of the method of the present invention.

The method of the present invention, with some embodiments, allows for the use of a lesser (or reduced) amount of curable photochromic coating composition compared to a comparative process, in which the same curable photochromic coating composition is applied over a dry surface of a comparable optical substrate that has not been previously treated with a first organic solvent, and which is not an organic solvent wetted surface. For purposes of non-limiting illustration, attention is directed to FIGS. 3A and 3B of the drawings. The optical substrate 52 of the photochromic optical articles of each of FIGS. 3A and 3B has the same composition, and the same curable photochromic coating composition and the same amount thereof is applied over each optical substrate. The optical substrate 52 of the optical article 5 of FIG. 3B is not subjected to a pretreatment application of a first organic solvent so as to form an organic solvent wetted surface, prior to application of the curable photochromic coating composition. The optical substrate 52 of the optical article 6 of FIG. 3A is subjected to a pretreatment application of a first organic solvent so as to form an organic solvent wetted surface, prior to application of the curable photochromic coating composition. The photochromic optical article 6 of FIG. 3A, which is representative of photochromic optical articles prepared in accordance with the method of the present invention, has a substantially uniform photochromic coating layer 54 formed over the upper (or forward) surface thereof. The photochromic optical article 5 of FIG. 3, which is not representative of photochromic optical articles prepared in accordance with the method of the present invention, has a non-uniform photochromic coating layer 54 formed over the upper (or forward) surface thereof.

The method of the present invention further includes, with some embodiments, applying a curable protective coating composition over the curable photochromic coating layer, thereby forming a curable protective coating layer over said curable photochromic coating layer; and at least partially curing the curable protective coating layer. In accordance with some embodiments, at least partially curing the curable protective coating layer results in at least partially curing concurrently the underlying curable photochromic coating layer.

With some further embodiments: the curable photochromic coating layer is at least partially cured, such as fully cured; the curable protective coating is applied over the at least partially cured photochromic layer, thereby forming a curable protective coating layer over the at least partially cured photochromic layer; and the curable protective coating layer is at least partially cured.

The resulting (or cured) protective coating layer (resulting from cure of the applied curable protective coating composition), with some embodiments includes an organic matrix that includes: (i) a polymer chosen from poly(meth)acrylates, polyethers, polythioethers, polyesters, polyamides, polyurethanes, polythiourethanes, polyvinyls, polyolefins, and combinations thereof; and (ii) a plurality of crosslink linkages chosen from ether linkages, sulfide linkages, carboxylic acid ester linkages, carbonate linkages (e.g., —O—C(O)—O—), urethane linkages (e.g., —N(H)—C(O)—O—), thiourethane linkages (e.g., —N(H)—C(O)—S—), siloxane linkages, carbon-carbon linkages, and combinations thereof. With some embodiments, carbon-carbon linkages are formed in the organic matrix of the protective coating layer by free radical reactions or free radical polymerization, such as in the case of actinic radiation curable coating compositions.

In accordance with some embodiments, the optional curable protective coating composition and the resulting protective coating layer are each free of one or more photochromic compounds.

The optional curable protective coating composition is, with some embodiments, selected from an abrasion-resistant coating compositions, such as a "hard coat." Application of the curable protective coating composition results in the formation of a curable protective coating layer, which is converted to a protective coating layer by curing thereof. Each protective coating layer can include a single layer or multiple layers, each having the same or a different composition. The optional protective coating layer, formed from the optional curable protective coating composition, can be selected from abrasion-resistant coatings including organo silanes, abrasion-resistant coatings including radiation-cured acrylate-based thin films, abrasion-resistant coatings based on inorganic materials such as silica, Mania and/or zirconia, organic abrasion-resistant coatings of the type that are ultraviolet light curable, oxygen barrier-coatings, UV-shielding coatings, and combinations thereof. With some embodiments, the optional protective coating layer is a hard coat layer that includes a first coating of a radiation-cured acrylate-based thin film and a second coating including an organo-silane. Non-limiting examples of commercially available hard coating products include SILVUE® 124 coatings, commercially available from SDC Coatings, Inc., and HI-GARD® coatings, commercially available from PPG Industries, Inc.

The optional protective coating layer can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134,191, 5,231,156 and International Patent Publication WO 94/20581 for disclosures of organo-silane hard coatings, which disclosures are also incorporated herein by reference. The hard coat layer can be applied by those coating methods as described previously herein with regard to the photochromic coating layer, such as spin coating.

Other curable coating compositions that can be used to form the optional protective coating layer, include, but are not limited to, curable polyfunctional acrylic hard coating compositions, curable melamine-based hard coating compositions, curable urethane-based hard coating compositions, curable alkyd-based coating compositions, curable silica sol-based hard coating compositions, and other organic or inorganic/organic hybrid hard coating compositions.

The optional curable protective coating compositions layer, with some embodiments, is selected from art-recognized curable organo-silane type hard coating compositions. Organo-silane type hard coating compositions from which the optional curable protective coating composition can be selected include, but are not limited to, those disclosed at column 24, line 46 through column 28, line 11 of U.S. Pat. No. 7,465,414 B2, which disclosure is incorporated herein by reference.

Further examples of coating compositions from which the optional curable protective coating composition can be selected, include but are not limited to: curable (meth)acrylate based protective coating compositions, such as described in U.S. Pat. No. 7,410,691; radiation curable acrylate based protective coating compositions, such as described in U.S. Pat. No. 7,452,611 B2; thermally cured protective coating compositions, such as described in U.S. Pat. No. 7,261,843; maleimide based protective coating compositions, such as described in U.S. Pat. No. 7,811,480; and dendritic polyester (meth)acrylate based protective coating compositions, such as described in U.S. Pat. No. 7,189,456.

The curable protective coating composition can optionally include one or more additives, such as described herein with regard to the curable photochromic coating composition.

The curable protective coating composition is, with some embodiments, curable by exposure to, for example: ambient temperatures, such as in the case of two component coating compositions; elevated temperatures (e.g., 80° C. to 150° C. for 5 to 60 minutes), such as in the case of thermally cured coating compositions; or actinic radiation, such as in the case of ultraviolet light curable coating compositions.

The optional protective coating layer can have any suitable thickness. With some embodiments, the optional protective coating layer has a thickness of from 0.5 microns to 20 microns, such as from 1 to 10 microns, or from 2 to 8 microns, or from 3 to 5 microns, inclusive of the recited values.

The method of the present invention, with some embodiments, further includes optionally applying one or more further coating compositions over the photochromic coating layer that are different than the protective coating composition. With some embodiments, the method of the present invention includes applying an anti-reflective coating layer over the photochromic coating layer. The optional anti-reflective coating layer can, with some embodiments be interposed between the photochromic coating layer and the protective coating layer, or reside over the protective coating layer, or reside over the photochromic coating layer in the absence of the protective coating layer.

The optional anti-reflective coating layer can be selected from art-recognized anti-reflective coating layers, and typically includes at least two layers each having a different refractive index. With some embodiments, the optional anti-reflective coating layer includes a first layer having a refractive index of from 1.6 to 2.5, or from 1.95 to 2.4, and a second layer having a refractive index of from 1.30 to 1.48, or from 1.38 to 1.48. The optional anti-reflective coating layer includes, with some embodiments, a plurality of such alternating first and second layers. With some embodiments, the first layer of the optional anti-reflective coating layer includes at least one of, $TiO_2$, $Ti_2O_3$, $Ti_3O_5$, $Pr_5O_{11}+xTiO_2$, $CeO_2$, $HfO_2$, $Ta_2O_5$, $ZrO_2$, and $SnO_2$. With some embodiments, the second layer of the optional anti-reflective coating layer includes at least one of, $SiO_2$, $MgF_2$, $AlF_3$, $BaF_2$, $Na_5Al_3E_{14}$, $Na_3AlF_6$, and $YF_3$. Examples of anti-reflective coating layers from which the optional anti-reflective coating layer can be selected are described in U.S. Pat. No. 6,175,450 B1 at column 1, line 56 through column 2, line 7; column 2, lines 50-65; and column 5, lines 22-58, which disclosure is incorporated herein by reference.

The method of the present invention further includes, with some embodiments, prior to the application of the first organic solvent, such as prior to step (i), treating the surface of the optical article with a plasma, thereby converting the surface of the optical article to a plasma treated surface. The first organic solvent is then applied to the plasma treated surface, thereby forming an organic solvent wetted surface on the optical substrate.

The plasma surface treatment can be selected from one or more art-recognized plasma surface treatment methods including, but not limited to, corona treatment, atmospheric plasma treatment, atmospheric-pressure treatment, flame plasma treatment, and/or chemical plasma treatment. With some embodiments, the plasma surface treatment is a corona surface treatment.

Plasma treatments, including corona treatments, with some embodiments, provide a clean and efficient method of altering the surface properties of the optical substrate, such as roughening and/or chemically altering one or more surfaces thereof, without altering the bulk properties of the optical substrate. With some embodiments, one or more inert gases (such as, but not limited to, argon and/or nitrogen) and/or one or more reactive gases (such as, but not limited to, oxygen, CO, and/or $CO_2$) can be used as the gas from which the plasma is formed. Inert gases, with some embodiments, roughen the surface of optical substrates. Reactive gases, such as oxygen, with some embodiments can both roughen and chemically alter the surface exposed to the plasma by, for example, forming hydroxyl and/or carboxyl groups on the treated surface.

Figure 1:
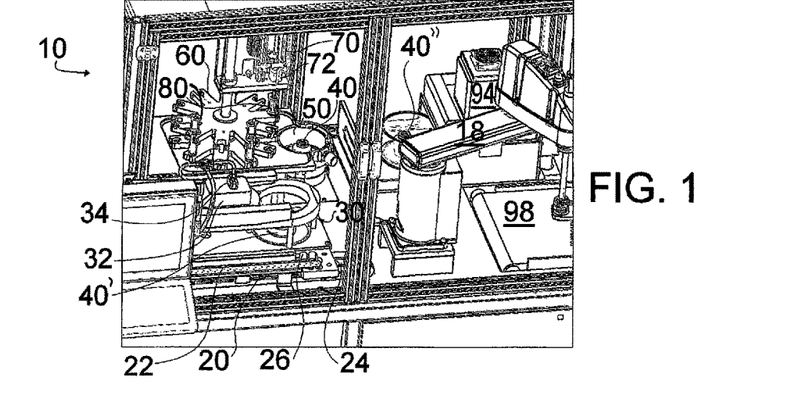
FIG. 1 is a representative perspective view of a spin coater that can be used in conjunction with some embodiments of the method of the present invention.

With some embodiments, the use of oxygen in the plasma surface treatment process (or step) can provide an effective degree of physical roughening and chemical modification of the surface of the optical substrate, which can improve adhesion without detrimentally effecting other properties, such as optical properties, of the optical substrate. Atmospheric air can also be used to form the plasma gas, and with some embodiments is a reactive gas. The extent of the surface roughening and/or chemical modification is, with some embodiments, a function of the plasma gas and the operating conditions underwhich the plasma is formed and applied, including the length of time of the surface treatment. With some embodiments, the optical substrates are exposed to a plasma surface treatment for 1 to 5 minutes, in a suitable chamber such as chamber 14 (as will be described in further detail herein), which results in the formation of surface treated optical substrates that can be further processed, such as in spin coater 10 (as will be described in further detail herein). Surface treatment of the optical substrates can also remove foreign contaminants present on the surface thereof. The presence of certain surface contaminants can, with some embodiments, undesirably reduce the surface energy of the surface of the optical substrate. A high surface energy, which can result after removal of the surface contaminants, promotes coating wetting, with some embodiments.

With some embodiments of the method of the present invention, the first organic solvent and the curable photochromic coating composition are each independently applied by spin coating application methods. In accordance with some further embodiments of the method of the present invention, the first organic solvent and the curable photochromic coating composition are each independently applied by spin coating application methods using a spin coater, such as, but not limited to, spin coater 10 depicted in FIGS. 1 and 2 of the drawings.

Figure 2:
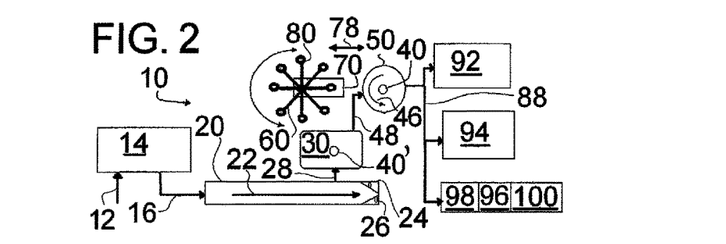
FIG. 2 is a representative schematic plan view of a modified embodiment of the spin coater of FIG. 1.

With non-limiting reference to the drawings, FIG. 1 is a representative perspective view of a flexible spin coater 10 that includes, or has associated therewith, integrated curing stations, for selectively applying multiple coatings to an optical substrate in accordance with some embodiments of the present invention. With reference to FIG. 2, there is depicted a representative schematic plan view of a modified embodiment of the spin coater 10 of FIG. 1.

The flexible spin coater 10 as described herein, and in accordance with some embodiments, provides a low cost, small scale (such as, producing up to 100 coated optical substrates per hour) top side spin coating machine that can include a surface pretreatment station (such as, but not limited to, plasma pretreatment station) that cleans, coats (utilizing one or more of multiple coatings and combinations of coatings), and which utilizes one or more of several different curing methods (such as, UV, IR, and/or thermal curing apparatae) or combinations thereof. The spin coater used with the method of the present invention can, with some embodiments, be operated with the formation of minimal waste streams and/or waste materials.

The spin coater used in accordance with some embodiments of the method of the present invention can have any suitable dimensions, which can, with some embodiments, be appropriately scaled to the space, such as a room, in which the spin coater is placed for operation. With some embodiments, the spin coater, including an enclosure, a control panel, and a filter (such as a high-efficiency particulate air or HEPA filter) has a width of from 0.76 meters (m) to 1.52 m (2.5 to 5 feet), or from 0.91 m to 1.37 m (3 to 4.5 feet); a length of from 0.91 m to 3.66 m (3 to 12 feet), or from 0.91 m to 3.05 m (3 to 10 feet), or from 1.22 m to 2.13 m (4 to 7 feet); and a height of from 1.83 m to 3.05 m (6 to 10 feet), or from 2.13 m to 2.74 m (7 to 9 feet).

The spin coater 10 can, with some embodiments, be used to coat a variety of substrates, such as, but not limited to, optical substrates. Examples of optical substrates that can be coated with the spin coater in accordance with various embodiments of the present invention include, but are not limited to, those optical substrates as described previously herein, such as, plano lenses, prescription lenses, which in each case can be finished lenses, unfinished lenses, or lens blanks.

With some embodiments, an initial step in the use of the spin coater 10, in accordance with some embodiments of the present invention, involves loading (see reference or step 12 of FIG. 2) the optical substrates (such as optical substrates 52) into a surface treatment chamber, such as plasma chamber 14. The plasma surface treatment conducted within chamber 14 can be selected from one or more art-recognized plasma surface treatment methods including, but not limited to, corona treatment, atmospheric plasma treatment, atmospheric-pressure treatment, flame plasma treatment, and/or chemical plasma treatment. With some embodiments, the surface treatment conducted in chamber 14 is an oxygen plasma treatment. The plasma treatment(s) conducted in chamber 14 are, with some embodiments, as described previously herein. The loading step 12 allows an operator to visually inspect the optical substrates (or lenses) for defects or damage before the process is begun. If dirt is visible the operator can clean the lenses by hand prior to placement into the plasma chamber 14 where they will undergo plasma treatment. The hand cleaning step can, with some embodiments, be conducted with deionized air. With some alternative embodiments, the operator can wipe the lenses, as needed, with one of several cleaning agents such as alcohol (such as isopropanol), or aqueous isopropanol, or an aqueous detergent.

Following the plasma surface treatment in chamber 14, the surface treated optical substrates are removed at step 16 and can optionally be subjected to visual and/or automated inspection prior to placement onto a loading unit 20 of spin coater 10. The optical substrates are forwarded along a path of travel 22 on loading unit 20, which can be achieved by way of a conveyer, such as a conveyer belt. The optical substrates are forwarded along path of travel 22, until they engage a positioning pocket 24. The loading unit 20 queues the optical substrates, and prevents the optical substrates from damaging each other (such as by engaging/rubbing/knocking each other) while sequentially presenting and introducing each individual optical substrate into positioning pocket 24. The edges of the positioning pocket 24 are configured, such as angled, to position each individual optical substrate in a pre-selected position (such as a centered position or location) relative to the width of the positioning pocket. Positioning pocket 24 also includes, with some embodiments, at least one (such as at least two) proximity sensors (such as beam breaking sensors 26) that identify the leading edge and/or trailing edge of each individual optical substrate, and cause the conveyor to stop when the optical substrate is sensed and determined to be properly positioned (such as centered) within positioning pocket 24.

Positioning pocket 24 allows spin coater 10 to be automated with a pick and place robotic arm 18 (shown only in FIG. 1). Robotic arm 18 engages the optical substrate in a manner that maintains a known center position of the optical substrate, such as within about 2 mm, throughout the process steps conducted in spin coater 10. The known center position of the optical lens can be so maintained as a result of a combination of, the accuracy of robotic arm 18, and the proper initial positioning of the optical substrate by and within positioning pocket 24, with some embodiments. The use of a pick and place robotic arm 18 allows spin coater 10 to be fully automated within the envelope (or operating reach) of robotic arm 18, and minimizes damage to, such as marking of, the surfaces of the optical substrate, compared to a manual process, such as a fully manual process.

The optical substrate can be wet or dry when picked up by robotic arm 18. With some embodiments, when wet, the optical substrate includes an organic solvent wetted surface or one or more wet coating layers thereon that are not hard, such as being tacky and/or uncured. With some further embodiments, when dry, the optical substrate is free of organic solvent and/or coating layers or includes one or more dry coating layers that are hard (and not tacky), such as being cured. In accordance with some embodiments, a lower portion of the gripper elements of robotic arm 18 engage and secure the optical substrate during wet pick up thereof (when the optical substrate is wet). With some further embodiments, upper portions of the gripper elements of robotic arm 18 engage and secure the lens during dry pick up thereof (when the optical substrate is dry).

The placement at step 12 into chamber 14 and removal from chamber 14 at step 16 can each be automated with an additional pick and place robotic arm (or the same pick and place robotic arm 18), which moves the positioning pocket 24 (or other positioning mechanism) upstream of chamber 14, with some embodiments. The use of an operator at chamber 14 allows for visual inspection of the optical substrates both before placement in and after removal from chamber 14, and allows for human oversight and control over spin coater 10 during operation thereof, with some embodiments. Art-recognized automated inspection procedures and equipment can be used to inspect the optical substrates before and/or after treatment thereof in chamber 14 in conjunction with or in place of manual inspection thereof, with some embodiments.

Robotic arm 18 moves the optical substrate (such as optical substrate 52) in step 28 to an optional washing and drying station 30, with some embodiments. With some embodiments, robotic arm 18 places the optical substrate on a rotatable chuck 40', which can be a rotatable vacuum chuck 40' with some embodiments, within the washing and drying station 30. Rotatable chuck 40' is programmable and can rotate at high speeds, such as up to 4,000 rpm, with some embodiments. After securing the optical substrate onto rotatable chuck 40', a top 32 (or lid) is slid to a closed position aligning high pressure water spray nozzles 34 with the optical substrate held on the rotating chuck 40'. The high pressure water spray nozzles are angled relative to the surface, including the edge, of the optical substrate held on the rotating vacuum chuck 40' for the purposes of cleaning the optical substrate, with some embodiments. In this manner the entire upper surface of the plasma treated optical substrate and edge can be cleaned, such as with deionized water under conditions of elevated pressure, such as about 1,000 psi, with some embodiments. Rotatable chuck 40' can rotate during spray washing to assure even cleaning of the optical substrate surface. The washing parameters, such as liquid pressure, washing time, and rotating speed can be programmable and can vary based on parameters, such as the type and/or size of the optical substrate, plasma treatment, and/or subsequent coating processes.

Following washing, the optical substrate can, with some embodiments be dried in station 30 by one or more drying methods including, but not limited to, high speed rotation of the rotatable chuck 40' and/or high speed air nozzle(s) (not shown), which can be filtered air nozzles. The drying parameters can be programmed in a manner similar to those associated with the washing parameters, with some embodiments.

Following washing and drying in station 30, the top 32 is slid to an open position, robotic arm 18 reengages the optical substrate on rotatable chuck 40', and robotic arm 18 moves the optical substrate in step 48 to and mounts the optical substrate on the rotatable chuck 40 in the coater bowl 50, which can be a rotatable vacuum chuck 40 with some embodiments. The rotatable chuck 40 is configured to receive the optical substrate within coater bowl 50 and configured to rotate the optical substrate during coating, the speed and timing of which can vary depending upon parameters including, but not limited to, the coating and optical substrate.

The coater bowl 50 is configured to collect: excess first organic solvent and coating material expelled from the optical substrate that is applied therein; and/or expelled during purging of the reservoirs 80 discussed further herein; and/or cleaning materials that are periodically utilized to clean coater bowl 50 (such as at the end of the week, or day, or shift). The spin coater 10 used with various embodiments of the present invention is effective as a once through system for small scale production, with some embodiments. A once through system means that the collected materials need not be recirculated and thus the collected material from coater bowl 50, can be removed through a drain not shown, need not be segregated or processed for reuse. A once through system allows for the efficient change out of the first organic solvent and distinct coating materials, with some embodiments.

The spin coater 10 that can be used with various embodiments of the present invention includes, with some embodiments, an indexable coating reservoir platform 60 containing a plurality of coating reservoirs 80. Each coating reservoir, with some embodiments, can each independently contain the first organic solvent, the curable photochromic coating composition(s), and optionally one or more additional coating compositions. Indexable coating reservoir platform 60 is configured to index a selected reservoir 80 into a dispensing position above coater bowl 50, so the reservoir 80 can be dispensed with a dispensing unit 70 at the dispensing position. The dispensing unit 70 is engagable with the selected coating reservoir 80 in the dispensing position to dispense a select (or pre-determined) amount of first organic solvent or coating composition from the engaged and selected coating reservoir 80.

The indexable coating reservoir platform 60 is a rotatable carousel having distinct circumferential positions, in which each distinct circumferential position reversibly receives one of the plurality of disposable coating reservoirs 80, with some embodiments. The carousel can, with some embodiments include eight- or ten-stations. The carousel can have other numbers of positions for reservoirs 80, with some further embodiments, such as, but not limited to, eighteen- or twenty-stations. The rotating carousel as shown represents an efficient embodiment for forming and operating the indexable coating reservoir platform 60. Other indexing arrangements, however, can be used in accordance with the spin coater used with various embodiments of the present invention. For purposes of non-limiting illustration, a linearly moving rack or line of reservoirs 80 can be used for forming platform 60, with no limit on the number of distinct reservoirs 80 that can be present in such an arrangement. The motor rotating the platform 60 can utilize a variety of art-recognized alignment mechanisms, such as a spring biased detent locking mechanism, to assure the held reservoirs 80 are moved into precise and predetermined indexed positions such that the reservoir 80 is in the dispensing position below and aligned with the dispensing unit 70.

Each coating reservoir 80 includes an elongated barrel (not shown) containing a moveable piston (not shown) for dispensing of coating material (such as the first organic solvent or the curable photochromic coating composition) from the coating reservoir 80, and in which advancement of moveable piston of the selected coating reservoir 80 in the dispensing position dispenses coating material from the selected coating reservoir 80, with some embodiments. With some embodiments, each coating reservoir 80 is formed as a disposable plastic syringe and thus each coating reservoir 80 dispenses coating through a valve-less dispensing orifice positioned at the distal end of the barrel. Plastic syringes are commercially available and are particularly well suited to form reservoirs 80 due to the precise dispensing characteristics associated there-with. Caps (not shown) on the rear surface and across the valve-less dispensing orifice can be used for shipping of filled reservoirs 80, with some embodiments. The caps can also be reapplied for removal and storage of reservoirs 80, with some further embodiments.

With some embodiments, each reservoir 80 is adapted for the printing of human and/or machine readable identification indicia on the optical substrate, such as, but not limited to bar codes, QR codes, and/or matrix codes. Machine readable identification indicia can include information relating to, the coating identification, the coating parameters associated with a particular coating material, and/or the type of optical substrate, with some embodiments. The coating parameters can include, with some embodiments, one or more of: the unit dosage of coating material for a given substrate (such as from 0.2 ml to 0.6 ml for conventional lens coatings); the rate of dispensing; the dispensing pattern (such as, start in the center of the vacuum chuck held substrate and move out, vice versa, or some other varied dispensing position); the speed of the vacuum chuck 40 (sometimes called spread speed); and/or the time of rotation (also called spread time).

The narrow distal orifice of reservoir 80 (with some embodiments in combination with the movable piston 84) allows the coating material to be held in the reservoir and dispensed in the absence of a valve. With some embodiments, the valve-less dispenser of reservoir 80 substantially eliminates (except for a single purge drip/drop) priming which is necessary with other spin coater dispensers, and greatly reduces the amount of waste formed during operation of spin coater 10.

Dispensing unit 70 includes a rod 72 aligned with the selected reservoir 80 in the dispensing position and is configured to selectively advance the moveable piston (not shown) of the selected coating reservoir 80 in the dispensing position to dispense a select (or predetermined) unit amount of coating material from the engaged selected coating reservoir 80. With some embodiments, rod 72 is a screw, such as an elongated screw. Rod 72 can be controllably driven by a stationary motor (not shown). With some embodiments, the select (or predetermined) unit amount of coating material dispensed is from 0.2 ml to 4 ml, or from 0.2 to 1 ml, or from 0.2 ml to 0.6 ml. The unit amount includes a coating amount and a purge amount (such as a drop) and can vary depending on parameters, including but not limited to, the coating material, the substrate characteristics, the desired coating thickness, and coating protocol.

In accordance with some embodiments of the present invention, rod 72 is a stationary rod and the motor (not shown) associated therewith is moveable, such as vertically moveable, along rod 72. The motor can include an extension (not shown) that engages abuttingly with the piston of the barrel of the reservoir 80. Controllable movement of the motor, such as vertically downward, along the stationary rod serves to drive the piston 84 into reservoir 80, which results in dispensing of a select (or predetermined) amount of coating material from the distal valve-less orifice thereof, with some embodiments.

In operation, and with some embodiments, the indexable coating reservoir platform 60, the reservoirs 80, and the unit 70 are moveable as a unit, shown schematically at 78, at least between: (i) a purge position, where the selected coating reservoir 80 in the dispensing position is above the coater bowl 50 but is not above the optical substrate or lens; and (ii) at least one dispensing position, where the selected coating reservoir in the dispensing position above the coater bowl is above the optical substrate. The coater bowl 50 can be constructed to include a trough or extension (not shown) that extends to a point aligned with the purge position. In the purge position the movable piston is advanced by rod 72 of unit 70 to dispense a minimal purging drop of the coating material to clear the outer surface of the meniscus of coating material at the distal valve-less orifice of reservoir 80. The outer surface of the meniscus can be exposed to air during non-use of the coating material in a given reservoir 80, which can result in oxidation and/or fouling the meniscus, thus requiring purging thereof. A single drop is all that is required to prime the coating material distribution system by purging the possibly non-homogeneous portion of the coating material from the distal orifice, with some embodiments. Following the initial purge drop, the indexable coating reservoir platform 60, the reservoirs 80, and the unit 70 are moveable as a single unit, shown schematically at 78, to at least one dispensing position where the selected coating reservoir 80 in the dispensing position above the coater bowl 50 is above the optical substrate.

With some embodiments, the distal orifice is dimensioned so that the coating material within the barrel of reservoir 80 does not flow out therefrom, in the absence of the movable piston therein being positioned (or moved) within the barrel towards the distal orifice thereof. With some embodiments, the distal orifice is circular and has a diameter of less than or equal to 3.18 mm (⅛ inch).

The movement 78 of the selected dispensing reservoir 80 allows the spin coater 10 to accommodate a variety of dispensing protocols for coating the optical substrate on rotatable chuck 40 within coater bowl 50. With some embodiments, the coating material (such as the first organic solvent or the curable photochromic coating composition) from the selected dispensing reservoir 80 can be dispensed on the optical substrate at the center, and/or at one or more select positions across the surface of the optical substrate (such as in a line, spiral, and/or concentric circles, across/on the upper surface of the optical substrate), and then the rotatable chuck 40 is engaged to spin the applied coating material to form a coating (or a first organic solvent) layer having substantially uniform thickness. In accordance with some further embodiments, concurrently with spinning of rotatable chuck 40, the coating material from the selected dispensing reservoir 80 is dispensed on the optical substrate at the center, and/or at one or more select positions across the surface of the optical substrate to form a uniform coating. Any desired combination of these dispensing and spinning protocols can be used with the spin coater 10. Additionally the dispensing rate and the spinning speed can also be varied throughout the process, with some embodiments. Intermittent dispensing and/or spinning of the vacuum chuck can used with some embodiments. The dispensing protocols are, with some embodiments, based upon parameters including, but not limited to, the substrate composition and/or surface treatment thereof, the coating material applied, and/or the desired final coating parameters.

The indexable platform 60 allows the spin coater 10 to apply a single or multiple coating layers on the optical substrate without removing the lens from the rotatable chuck 40. With some embodiments of the method of the present invention, and for purposes of non-limiting illustration, in a first stage, a first organic solvent is applied to a surface of the optical substrate using a first reservoir 80, so as to form an organic solvent wetted surface on the optical substrate. Next, the carousel is indexed, such that in a second stage a curable photochromic coating composition is applied over the organic solvent wetted surface of the optical substrate, from a distinct/separate second reservoir 80. Optionally, the carousel can be further indexed, such that in a third stage an optional coating composition (such as a curable protective coating composition) is applied over the previously applied curable (or at least partially cured) photochromic coating layer, from a distinct/separate third reservoir 80. The indexing of the carousel can be done with the platform 60 moved away from alignment of the reservoirs 80 with the optical substrate, so no stray drips from intermediate reservoirs 80 interfere with the desired coating protocol, and so that, for example, in the second stage the curable photochromic coating composition can be properly purged before dispensing over the organic solvent wetted surface of the optical substrate. Having two or more coating stages allows the spin coater, in accordance with some embodiments of the present invention, to apply and form numerous combinations of stacked coating layers, in which each coating layer thereof has the same or different composition and/or the same or different thickness relative to an adjacent (or abutting) coating layer.

In accordance with some embodiments of the present invention, the spin coater includes or has integrated therewith at least one distinct curing station (such as curing stations 92, 94, and 96) for selectively and independently curing (such as at least partially curing) each coating applied to the optical substrate. The spin coating includes or has integrated therewith, with some further embodiments, a plurality of distinct curing stations (such as two or more curing stations, such as curing stations 92, 94, and 96) each for selectively and independently curing (such as at least partially curing) each coating applied to the optical substrate. Following the application of the desired coating material at coating bowl 50, robotic arm 18 reengages the optical substrate and moves it, at step 88, to a designated curing station (92, 94, or 96). With some embodiments of the present invention, each curing station independently includes at least one of: (i) a thermal curing station 96; (ii) a UV curing station 94; (iii) an IR curing station 92; and (iv) combinations of at least two of (i), (ii), and (iii).

The UV curing station 94 (of FIG. 1) of the flexible spin coater 10 includes a sliding drawer and a rotatable chuck 40" (which can be a rotatable vacuum chuck 40" with some embodiments) for selective receipt of a desired optical substrate to be cured. A concave or angled reflective mirror (not shown) can surround rotatable chuck 40" to assist or improve in edge curing, with some embodiments. With a coated optical substrate on rotatable chuck 40" of UV curing station 94, the drawer is closed and a shutter opened to expose the coated optical substrate to UV light (such as from a mercury or metal halide bulb) within UV curing station 94. Rotatable chuck 40" can rotate at slow speeds within UV curing station 94 to further assure a uniform cure, with some embodiments. The curing time within UV curing station 94 can vary depending on, for example, the particular coating. The IR curing station 92 can have a similar construction as UV curing station 94, but includes an appropriate IR source. The curing time within IR curing station 92 can also vary depending on, for example, the particular coating. Each curing station, with some embodiments, can include therein an atmosphere selected from an inert atmosphere (such as, but not limited to, argon and/or nitrogen) and/or a reactive atmosphere (such as, but not limited to, oxygen, CO, and/or $CO_2$).

The thermal curing station 96, with some embodiments, is accompanied (or associated) with a throughput conveyor 98 and a discharge or accumulation area 100. In the thermal curing station the optical substrates to be thermally cured are placed on the input conveyer, such as side-by-side on conveyor 98. The speed of the conveyor is selected so the coated optical substrates have a desired temperature exposure within curing station 96. The oven of thermal curing station 96 can, with some embodiments be an electric oven and/or a gas fired oven (such as a natural gas fired oven). The curing times and temperature profiles can vary depending on, for example, the coating that is to be cured. With some embodiments, the coated optical substrates are exposed to a temperature of 115°–135° C. for 20-40 minutes, such as 30 minutes at 125° C. for 30 minutes within the thermal curing station. Following at least partial curing, the coated optical substrates are forwarded to an accumulation area 100 designed to accommodate a desired number of optical substrates with no edges touching there-between (such as, but not limited to, up to 30 coated optical substrates), with some embodiments.

With some embodiments, conveyor 98 in concert with robotic arm 18 is used for egress of at least partially cured coated optical substrates from the IR curing station and/or the UV curing station. With some embodiments, a separate exit conveyor (not shown) is used to bypass the thermal curing station 96 for purposes of delivering coated optical substrates to accumulation area 100.

In accordance with some further embodiments, an optical substrate can be washed, then coated, then re-washed, and then subsequently coated with the same or a different coating material before curing. With some additional embodiments, a coated and cured optical substrate can be returned from a curing station (92, 94, or 96) to: (i) the washing and drying station; and/or (ii) coater bowl 50 for the application thereto of a subsequent coating material. An optical substrate can, with some embodiments, be moved from accumulation area 100 back to loading unit 20 for the subsequent application thereto or one or more coating materials.

In accordance with some embodiments of the present invention, an optical substrate is mounted on a rotatable chuck (such as rotatable chuck 40) of a spin coating bowl (such as spin coating bowl 50) of a spin coater (such as spin coater 10). A first organic solvent is then applied to a surface of the optical substrate with rotation of the optical substrate by the rotatable chuck (such as rotatable chuck 40), which results in the formation of an organic solvent wetted surface on the optical substrate. A curable photochromic coating composition is next applied over the organic solvent wetted surface of the optical substrate with rotation of the optical substrate by the rotatable chuck (such as rotatable chuck 40), thereby forming a curable photochromic layer over the surface of said optical substrate. As discussed previously herein, and in accordance with some embodiments, the curable photochromic coating composition includes a second organic solvent, and the first organic solvent and the second organic solvent are miscible with each other.

In accordance with some further embodiments of the present invention, the photochromic coating layer on the optical substrate is at least partially cured in a first curing station (such as a curing station that includes a UV curing apparatus, an IR curing apparatus, and/or a thermal curing apparatus). Next, the optical substrate, which includes the at least partially cured photochromic coating layer, is mounted on the rotatable chuck (such as rotatable chuck 40) of the spin coating bowl (such as spin coating bowl 50) of the spin coater (such as spin coater 10). In a subsequent step, a curable protective coating composition is applied over the at least partially cured photochromic coating layer of the optical substrate with rotation of the rotatable chuck (such as rotatable chuck 40), thereby forming a protective coating layer over the at least partially cured photochromic coating layer. In a further subsequent step, the protective coating layer on the optical substrate is at least partially cured in a second curing station (such as a curing station that includes a UV curing apparatus, an IR curing apparatus, and/or a thermal curing apparatus).

In accordance with some embodiments, the first curing station and the second curing station are the same. With some embodiments the first curing station and the second curing station are the same curing station positioned in a single physical location, which can included the same curing apparatus or apparatuses.

In accordance with some embodiments, the first curing station and the second curing station are different. With some embodiments the first curing station and the second curing station are different curing stations each positioned at a different physical location, and each curing station can include the same or different curing apparatus or apparatuses.

In accordance with some embodiments, the photochromic coating composition is stored in a second reservoir, and the protective coating composition is stored in a third reservoir, in which the second reservoir and the third reservoir each reside on an indexable coating reservoir platform. The method further includes, with some embodiments: moving the second reservoir to a dispensing position to apply the curable photochromic coating composition over the organic solvent wetted surface of the optical substrate; and moving the third reservoir to said dispensing position to apply the curable protective coating composition over the curable or at least partially cured photochromic coating layer.

In accordance with some embodiments, the first organic solvent is stored in a first reservoir, the photochromic coating composition is stored in a second reservoir, and the protective coating composition is stored in a third reservoir, in which the second reservoir and the third reservoir each reside on an indexable coating reservoir platform. The method further includes, with some embodiments: moving the first reservoir to a dispensing position to apply the first organic solvent to a surface of the optical substrate, thereby forming an organic solvent wetted surface on the optical substrate; moving the second reservoir to a dispensing position to apply the curable photochromic coating composition over the organic solvent wetted surface of the optical substrate; and moving the third reservoir to the dispensing position to apply the curable protective coating composition over the curable or at least partially cured photochromic coating layer.

In accordance with some embodiments, the first reservoir, the second reservoir, and the third reservoir each independently include a valve-less dispensing orifice independently positioned at a distal end of each reservoir through which, in each case, the first organic solvent, the photochromic coating composition, and the protective coating composition are each independently dispensed.

With some embodiments, the curable photochromic layer is substantially fully cured prior to the optional application of one or more optional coating layers thereover, such as a protective coating layer. Prior to the application of one or more further optional coating layers thereover, the cured photochromic coating layer can be subjected to an optional washing step (such as in washer/drying 30) and/or an optional plasma treatment step (such as in plasma chamber 14), in accordance with some embodiments of the present invention.

The present invention is more particularly described in the following examples, which are intended to be illustrative only, since numerous modifications and variations therein will be apparent to those skilled in the art. Unless otherwise specified, all parts and all percentages are by weight.

EXAMPLES

All examples described below used as substrate 5.50 base 76 mm semi-finished single vision Polycarbonate lenses, obtained from Gentex Optics. Prior to spin coating, each lens was subjected to an Oxygen Plasma using a PE-50 model plasma cleaner, purchased from PlasmaEtch, Inc. The plasma cleaning was performed using the settings listed in Table 1.

TABLE 1

| PE-50 plasma etch settings | |
| --- | --- |
| Pressure | 300 mtorr |
| Oxygen Flow | 7 sccm |
| Plasma Generator | 120 W 13.56 Mhz RF Power Supply at 100% |
| Treatment Time | 3 Minutes |

All solvent layers and coating layers were applied using a spin coater that included multiple reservoirs capable of dispensing distinct materials sequentially onto the front (convex) surface of the lens substrate. In the following example and comparative examples, N-methyl pyrrolidone (NMP) solvent layer, when present, was dispensed from a first reservoir. All applications of NMP were subject to spin parameters of 2 seconds at 1250 rpm prior to the next step. A photochromic polyurethane coating, prepared by blending the components listed in Table 2, was dispensed from a second reservoir and subjected to spin parameters of 3 seconds at 1600 rpm.

TABLE 2

| Photochromic polyurethane coating compositions | |
| --- | --- |
| Component | Weight % |
| NMP | 28.321 |
| Acrylic polyol[1] | 17.770 |
| DURANOL ® T5652[2] | 16.040 |
| TRIXENE ® BI7960[3] | 30.603 |
| K-KAT ® 348[4] | 0.483 |
| BYK ® 333[5] | 0.036 |
| SILQUEST ® A-187[6] | 1.914 |
| TINUVIN ® 144[7] | 0.966 |
| IRGANOX ® 245[8] | 0.966 |
| KEYPLAST ® Magenta RB[9] | 0.002 |
| Photochromic Dyes[10] | 2.899 |

[1]Made from free radical polymerization of Hydroxypropyl methacrylate (40.4%), Butyl methacrylate (57.6%) and Acrylic acid (2.0%) with a number average molecular weight of 5500 as determined by GPC with polystyrene standard and tetrahydrofuran diluent. Material reduced to 61% solids using dipropylene glycol methyl ether acetate.
[2]A polycarbonate diol available from Asahi Kasei
[3]Dimethyl pyrazole blocked hexane diisocyanate biuret from Baxenden
[4]A Bismuth carboxylate catalyst from King Industries
[5]A surfactant available from BYKChemie
[6]An epoxy silane adhesion promoter available from Momentive
[7]A hindered Amine light stabilizer available from BASF Company.
[8]An antioxidant available from BASF Company.
[9]A Magenta Dye available from Keystone Aniline Corporation
[10]A mixture of naphthopyran photochromic materials in proportions designed to give a gray tint to the coating when activated by UV radiation.

Each of the Examples and Comparative Examples were prepared according to Table 3, by applying the quantities indicated using the spin parameters described above. In Example 1, the photochromic coating was applied 5 seconds after completion of the NMP application, such that the entire surface of the optical substrate remained wet. Comparative Example CE-1 includes an additional step of evaporating the applied first solvent by placing in an oven at 125° C. for 30 minutes prior to application of the photochromic coating. Comparative Examples CE-2 and CE-3 were not coated with a first solvent prior to application of the photochromic coating.

After application of the photochromic coating layer, all coated substrates were cured in a thermal convection oven set at 125° C. for 1 hour prior to qualitative evaluation of the coated substrate. A result reported as "fully coated, acceptable lens" represents a coating that is present uniformly and continuously across the entire front surface of the lens, such as represented by FIG. 3A of the drawings. A result of "partially coated, unacceptable lens" indicates that there are portions of the front surface of the lens that remain uncoated after the spin application, such as represented by FIG. 3B of the drawings.

TABLE 3

Preparation of coated photochromic optical substrates

| Example | NMP Dispense Volume (ml) | NMP Wet Film weight (grams) | Photochromic coating Dispense Volume (ml) | Photochromic Coating Wet Film Weight (grams) | Photochromic Coating Waste (grams) | Results |
|---|---|---|---|---|---|---|
| 1 | 0.50 | 0.051 | 0.327 | 0.257 | 0.070 | Fully coated, acceptable lens |
| CE-1 | 0.50 | 0 | 0.327 | 0.211 | 0.116 | Partially coated, unacceptable lens |
| CE-2 | 0 | 0 | 0.327 | 0.201 | 0.126 | Partially coated, unacceptable lens |
| CE-3 | 0 | 0 | 7 | 0.250 | 6.750 | Fully coated, acceptable lens |

Example 1 demonstrates the preparation of a fully coated acceptable lens by application of a first solvent, thus providing a wetted surface on an optical substrate, followed by application of a photochromic coating according to the present invention. Comparative Examples CE-1 and CE-2 demonstrate the effect when the optical substrate surface is not wetted by a solvent at which time the same amount of photochromic coating is applied. Finally, Comparative Example CE-3 illustrates the comparatively large amount of photochromic coating composition, and subsequent waste, necessary to accomplish a fully coated, acceptable lens in the absence of an organic solvent wetted surface according to the present invention.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a photochromic article comprising:
    (a) mounting an optical substrate on a rotatable chuck of a spin coating bowl of a spin coater;
    (b) applying a first organic solvent to a surface of said optical substrate with rotation of said optical substrate by said rotatable chuck, thereby forming an organic solvent wetted surface on said optical substrate;
    (c) applying a curable photochromic coating composition over said organic solvent wetted surface of said optical substrate with rotation of said optical substrate by said rotatable chuck, thereby forming a curable photochromic layer over said organic solvent wetted surface of said optical substrate,
    wherein said curable photochromic coating composition comprises a second organic solvent, and wherein the first organic solvent and the second organic solvent are miscible with each other;
    (d) curing, at least partially, said photochromic coating layer in a first curing station, thereby forming an at least partially cured photochromic coating layer on said optical substrate;
    (e) mounting the optical substrate, comprising said at least partially cured photochromic coating layer, on said rotatable chuck of the spin coating bowl of the spin coater;
    (f) applying a curable protective coating composition over said at least partially cured photochromic coating layer of said optical substrate with rotation of said rotatable chuck, thereby forming a protective coating layer over said at least partially cured photochromic coating layer; and
    (g) at least partially curing said protective coating layer on the optical substrate in a second curing station,
    wherein said first organic solvent is stored in a first reservoir, said photochromic coating composition is stored in a second reservoir, and said protective coating composition is stored in a third reservoir, wherein said first reservoir, said second reservoir, and said third reservoir each reside on a moveable, indexable coating reservoir platform, wherein said indexable coating reservoir platform is a rotatable carousel having distinct circumferential positions,
    said method further comprising,
    indexing the indexable coating reservoir platform to rotatably move said platform to move said second reservoir to a distinct circumferential position, and laterally moving said platform to position said second reservoir to a dispensing position to apply said curable photochromic coating composition over said organic solvent wetted surface of said optical substrate, and
    indexing the indexable coating reservoir platform to rotatably move said platform to move said third reservoir to said distinct circumferential position, and laterally moving said platform to positon said third reservoir to said dispensing position to apply said curable protective coating composition over said at least partially cured photochromic coating layer.

2. The method of claim 1, wherein said first curing station and said second curing station are different.

3. The method of claim 1, wherein the first organic solvent and the second organic solvent are the same.

4. The method of claim 3, wherein the first organic solvent is selected from the group consisting of N-methyl 2-pyrrolidone, diethylene glycol monobutyl ether, 2-butoxyethyl ester of acetic acid, ethylene glycol monohexyl ether, n-butyl acetate, glycol ethers, and hydrocarbon blends.

5. The method of claim 3, wherein the first organic solvent is N-methyl 2-pyrrolidone.

6. The method of claim 5 further comprising, curing said curable photochromic coating layer, thereby forming a cured photochromic coating layer, wherein said cured photochromic coating layer comprises urethane linkages.

7. The method of claim 3 further comprising,
    treating, prior to step (b), said surface of said optical article with a plasma, thereby converting said surface of said optical article to a plasma treated surface.

8. The method of claim 1, wherein said second reservoir and said third reservoir each comprise a valve-less dispensing orifice positioned at a distal end of each reservoir through which said photochromic coating composition and said protective coating composition are each independently dispensed.

* * * * *

UNITED STATES PATENT AND TRADEMARK OFFICE
CERTIFICATE OF CORRECTION

PATENT NO. : 10,281,628 B2  
APPLICATION NO. : 15/026634  
DATED : May 7, 2019  
INVENTOR(S) : Jerry L. Koenig, II et al.

Page 1 of 1

It is certified that error appears in the above-identified patent and that said Letters Patent is hereby corrected as shown below:

In the Claims

Column 30, Line 43, Claim 1, delete "positon" and insert -- position --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*